United States Patent
Detloff et al.

(10) Patent No.: US 10,502,585 B2
(45) Date of Patent: Dec. 10, 2019

(54) GYRO RATE COMPUTATION FOR AN INTERFEROMETRIC FIBER OPTIC GYRO

(71) Applicant: The Boeing Company, Chicago, IL (US)

(72) Inventors: Shaun M. Detloff, Huntington Beach, CA (US); James K. Gingrich, Heath, OH (US)

(73) Assignee: The Boeing Company, Chicago, IL (US)

( * ) Notice: Subject to any disclaimer, the term of this patent is extended or adjusted under 35 U.S.C. 154(b) by 816 days.

(21) Appl. No.: 14/522,462

(22) Filed: Oct. 23, 2014

(65) Prior Publication Data

US 2016/0116301 A1    Apr. 28, 2016

(51) Int. Cl.
*G01C 19/72*    (2006.01)
*G01C 25/00*    (2006.01)

(52) U.S. Cl.
CPC .............. *G01C 25/00* (2013.01); *G01C 19/72* (2013.01); *G01C 19/721* (2013.01); *G01C 25/005* (2013.01)

(58) Field of Classification Search
CPC ............................ G01C 25/00; G01C 19/721
See application file for complete search history.

(56) References Cited

U.S. PATENT DOCUMENTS

| | | | |
|---|---|---|---|
| 4,514,088 A * | 4/1985 | Coccoli | G01C 19/727 356/461 |
| 4,844,615 A | 7/1989 | Benoist | |
| 5,137,360 A | 8/1992 | Ferrar | |
| 5,296,912 A * | 3/1994 | Strandjord | G01C 19/727 356/461 |
| 5,325,174 A * | 6/1994 | Danko | G01C 19/727 356/461 |
| 5,420,684 A * | 5/1995 | Carroll | G01C 19/727 356/461 |
| 5,434,670 A * | 7/1995 | Albers | G01C 19/66 356/459 |
| 5,442,442 A * | 8/1995 | Kanegsberg | G01C 19/66 356/473 |
| 5,469,257 A * | 11/1995 | Blake | G01C 19/721 356/464 |

(Continued)

FOREIGN PATENT DOCUMENTS

| | | |
|---|---|---|
| EP | 1795865 A2 | 6/2007 |
| EP | 1967819 A2 | 9/2008 |

(Continued)

OTHER PUBLICATIONS

Search Report for related French Application No. FR1560086; report dated Sep. 5, 2017.

(Continued)

*Primary Examiner* — Mohamed Charioui
*Assistant Examiner* — Christine Y Liao
(74) *Attorney, Agent, or Firm* — Miller, Matthias & Hull LLP

(57) ABSTRACT

A method comprises supplying an optical input to an interferometric fiber optic gyro (IFOG) at a first frequency and then a different second frequency; detecting a difference in responses of the IFOG to the optical input at the first and second frequencies; and computing a gyro rate as a function of the difference and a correction term.

14 Claims, 3 Drawing Sheets

(56) References Cited

U.S. PATENT DOCUMENTS

| | | | |
|---|---|---|---|
| 5,923,424 A * | 7/1999 | Sanders | G01C 19/728 |
| | | | 356/464 |
| 5,946,097 A | 8/1999 | Sanders et al. | |
| 7,372,574 B2 * | 5/2008 | Sanders | G01C 19/727 |
| | | | 356/461 |
| 7,515,271 B2 | 4/2009 | Greening et al. | |
| 2003/0093194 A1 * | 5/2003 | Li | B64G 1/36 |
| | | | 701/13 |
| 2004/0186676 A1 * | 9/2004 | Liu | G01C 21/16 |
| | | | 702/92 |
| 2007/0121117 A1 | 5/2007 | Chen | |
| 2008/0218764 A1 * | 9/2008 | Chen | G01C 19/721 |
| | | | 356/460 |
| 2012/0307252 A1 | 12/2012 | Moores et al. | |
| 2014/0049780 A1 * | 2/2014 | Sanders | G01C 19/727 |
| | | | 356/461 |

FOREIGN PATENT DOCUMENTS

| | | |
|---|---|---|
| JP | H10311729 A | 11/1998 |
| JP | 2007127648 A | 5/2007 |
| JP | 2007163486 A | 6/2007 |

OTHER PUBLICATIONS

Office Action for related Chinese Application No. 2015-201779; report dated Aug. 26, 2019.

* cited by examiner

GYRO RATE COMPUTATION FOR AN INTERFEROMETRIC FIBER OPTIC GYRO

BACKGROUND

During operation of an interferometric fiber optic gyro (IFOG), drift-related errors may grow over time. To correct for drift-related errors, the IFOG's scale factor may be recalibrated During operation, an event may occur that degrades the performance of the IFOG. For example, an event causes the IFOG's fiber optic coil to darken. To compensate for such degradation, the IFOG's scale factor may be recalibrated.

SUMMARY

According to an embodiment herein, a method comprises supplying an optical input to an interferometric fiber optic gyro (IFOG) at a first frequency and then a different second frequency; detecting a difference in responses of the IFOG to the optical input at the first and second frequencies; and computing a gyro rate as a function of the difference and a correction term.

According to another embodiment herein, a system comprises an interferometric fiber optic gyro (IFOG); a fiber optic light source for supplying an optical input to the IFOG at a first frequency and then a different second frequency; a photodetector for detecting responses of the IFOG to the optical input at the first and second frequencies; and a processor for computing a gyro rate as a function of a difference of the responses and a correction term.

According to another embodiment herein, a method for an interferometric fiber optic gyro (IFOG) comprises applying a known rate to the IFOG and determining IFOG scale factors for optical inputs at first and second frequencies; providing an optical input to the IFOG at the first frequency and detecting a first response of the IFOG; switching the optical input to the second frequency and detecting a second response of the IFOG; and using a difference between the first and second responses, the known rate, and the scale factors to determine an IFOG correction term. The correction term represents a sum of time-dependent errors in the first and second IFOG responses.

These features and functions may be achieved independently in various embodiments or may be combined in other embodiments. Further details of the embodiments can be seen with reference to the following description and drawings.

DETAILED DESCRIPTION

Figure 1:
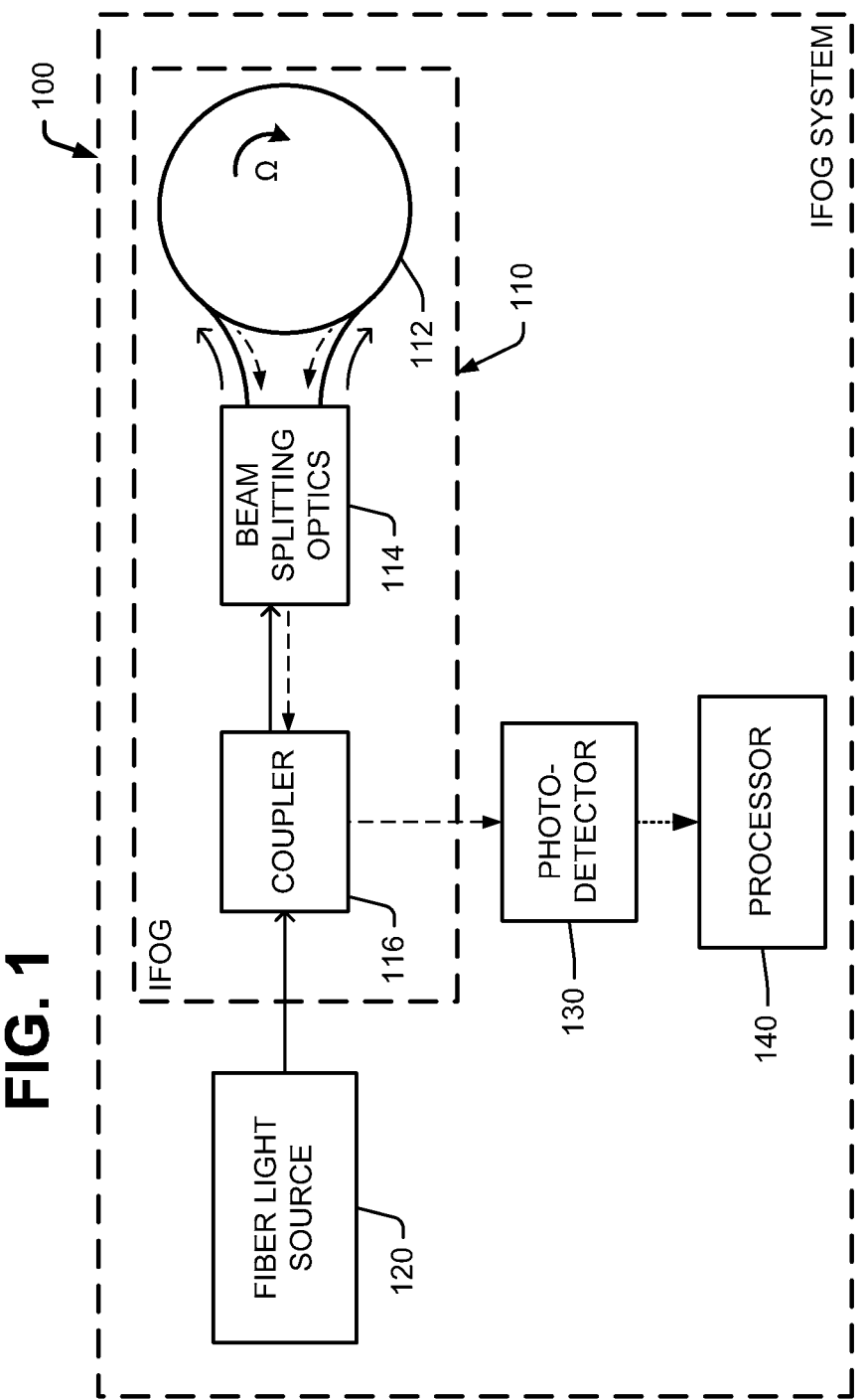
FIG. 1 is an illustration of a system including an interferometric fiber optic gyro.

Referring to FIG. 1, an interferometric fiber optic gyro system 100 includes an interferometric fiber optic gyro (IFOG) 110. The IFOG 110 may include a fiber optic sensing coil 112, beam splitting optics 114, and coupler 116. The system 100 further includes a fiber light source 120, which provides an optical input to the IFOG 110. The beam splitting optics 114 splits the optical input into two light beams that propagate in opposite directions through the sensing coil 112. On return to the point of entry, these two counter-propagating light beams exit the sensing coil 112, are recombined by the beam splitting optics 114, and undergo interference. When there is a rotation around an axis of the sensing coil 112, relative phases of the two exiting beams, and thus the position of their interference fringes, are shifted according to angular velocity of the rotation. This is known as a Sagnac phase shift. The Sagnac phase shift (Ø) may be expressed as $$\phi = \frac{2\pi LD}{\lambda c}\Omega,$$

where L and D are length and diameter of the sensing coil 112, $\lambda$ is mean wavelength of source light in vacuum, and $\Omega$ is gyro rate.

The system 100 further includes a photodetector 130 for detecting the Sagnac phase shift. The photodetector 130 has an induced voltage that varies with light intensity. An output signal (e.g., the induced voltage) of the photodetector 130 typically follows the cosine of the phase variation between the two beams exiting the sensing coil 112.

The fiber light source 120 is configured to provide the optical input at a first frequency to the IFOG 110, and then switch to a second frequency. For example, the fiber light source 120 may include a first source for providing light at the first frequency, a second source for providing light at the second frequency, and an optical switch for switching the optical input between the first and second sources. The photodetector 130 detects two different phase shifts (IFOG responses).

The system 100 further includes a processor 140 for computing gyro rate in response to an output of the photodetector 130. The processor 140 may also command the fiber light source 120 to switch the optical input between the first and second frequencies.

Figure 2:
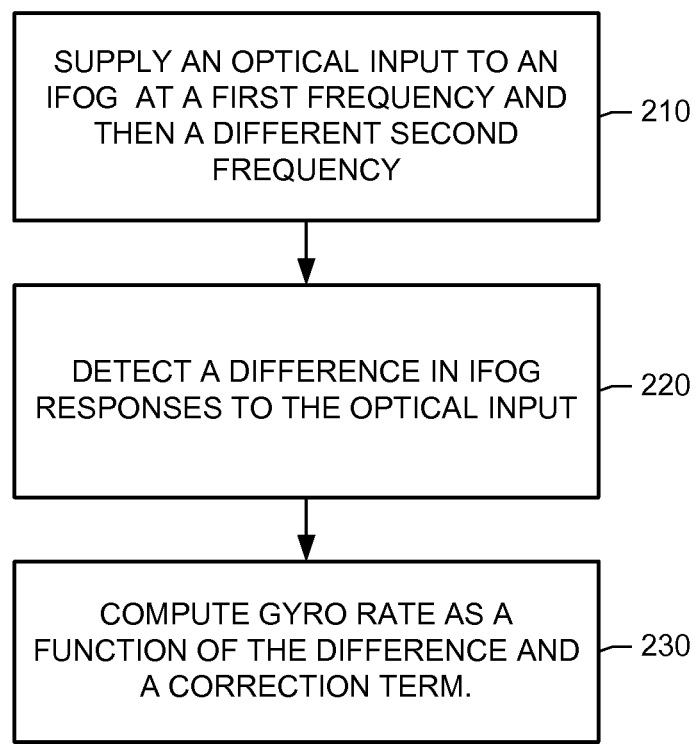
FIG. 2 is an illustration of a method of computing a gyro rate in the interferometric fiber optic gyro.

Additional reference is made to FIG. 2, which illustrates a method of using the system 100 to sense the gyro rate. At block 210, the fiber light source 120 supplies an optical input to the IFOG 110 at a first frequency and then switches to a different second frequency. Two different Sagnac phase shifts are produced. The photodetector 130 detects these first and second responses of the IFOG 110.

At block 220, the processor 140 determines a difference in IFOG responses to the optical input. The difference may be determined by measuring a difference in voltages representing the first and second responses.

At block 230, the processor 140 computes the gyro rate as a function of the difference and a correction term. An example of an equation for computing the gyro rate is provided below in equation (4).

The correction term is pre-computed according to pre-determined first and second scale factors at the first and second frequencies for the IFOG 110. For instance, the scale factors and the correction term may be pre-computed in a factory prior to placing the IFOG 110 into service.

During operation of the IFOG 110, bias and the first and second scale factors will change over time. Contributing factors include changes in input axis, fiber degradation, and temperature changes. For a conventional IFOG, these time-dependent errors would require recalibration. Not so for the IFOG 110. So long as the shift in the first and second scale factors is roughly the same, the correction term will be stable, and the gyro rate may still be computed as a function of the difference and the correction term. That is, the function at block 230 may be repeated without having to recalibrate the IFOG 110.

During operation of the IFOG 110, an event may occur that degrades the performance of the IFOG 110. For example, an event causes the sensing coil 112 to darken. This event will cause the first and second scale factors to shift equally. For a conventional IFOG, the event would result in recalibration. Not so for the IFOG 110. The function at block 230 may be repeated without having to recalibrate the IFOG 110.

Figure 3:
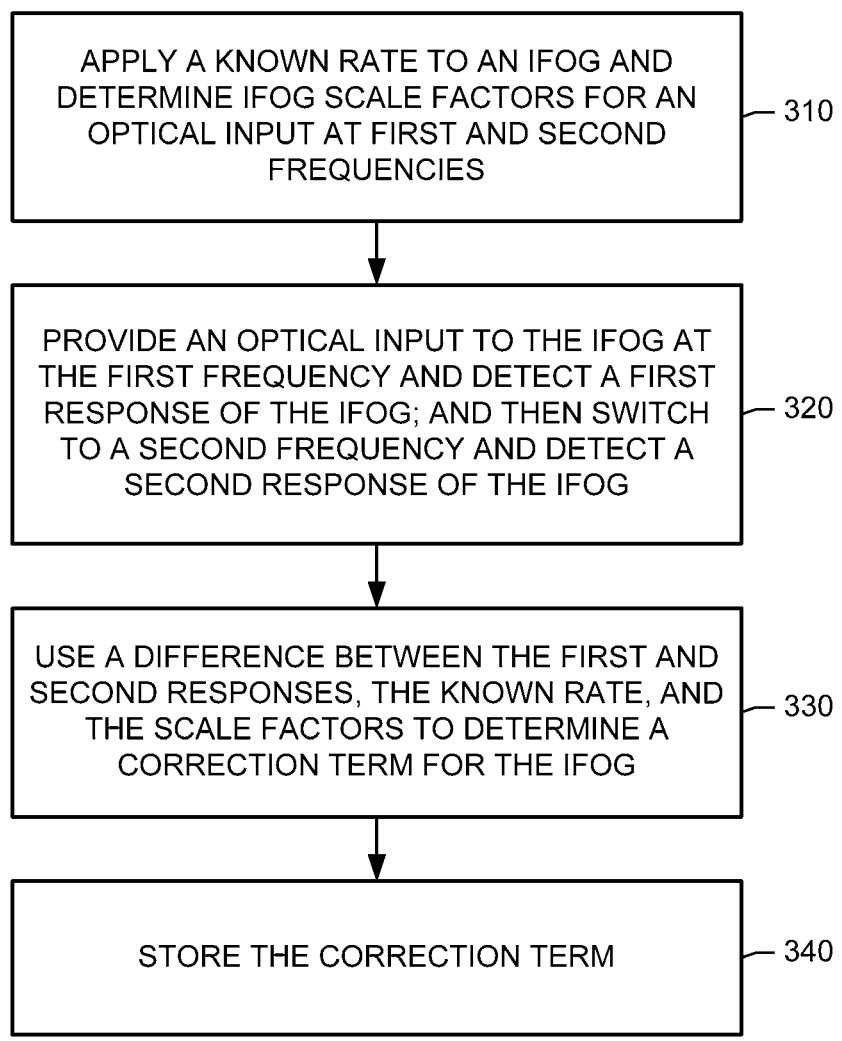
FIG. 3 is an illustration of a method of estimating time-dependent errors during operation of the interferometric fiber optic gyro.

Reference is made to FIG. 3. A method of determining the correction term (C) will now be described. The system 100 may be used to determine its own correction term (C).

At block 310, first and second scale factors ($SF_1$ and $SF_2$) for the IFOG 110 are determined. A known rate may be applied to the IFOG 110, the fiber light source 120 supplies an optical input to the IFOG 110 at a first or second frequency ($f_1$ or $f_2$), the photodetector 130 measures the IFOG response, and the processor 140 uses a model to determine the scale factor ($SF_1$ or $SF_2$). For example, the scale factor may be derived from $$\phi = \frac{2\pi LD}{\lambda c} \Omega.$$

At block 320, the fiber light source 120 provides an optical input to the IFOG 110 at the first frequency ($f_1$), and the photodetector 130 detects the first response of the IFOG 110. Then, the fiber light source 120 switches the optical input to the second frequency ($f_2$), and the photodetector 130 detects the second response of the IFOG 110. Thus, the photodetector 130 detects two different Sagnac phase shifts at the two different scale factors ($SF_1$ and $SF_2$).

At block 330, the processor 140 uses a difference between the first and second responses, the known rate, and the scale factors to determine the correction term (C) for the IFOG 110. A model for computing the correction term (C) may be derived as follows.

Consider the following model from IEEE standard 952-1997 ("IEEE Standard Specification Format Guide and Test Procedure for Single-Axis Interferometric Fiber Optic Gyros"):

$$s0*(\Delta n/\Delta t)=(I+E+D)*s0er \quad (1)$$

where s0 is the scale factor, ($\Delta n/\Delta t$) is the output response of the IFOG 110, I is the optical input to the IFOG 110 (°/hr), E is the environmental sensitivity of the IFOG 110 (°/hr), D is the drift rate (°/hr), and s0er is the scale factor error term.

The term ($\Delta n_1/\Delta t$) may be rewritten as $\Omega+Df$. The term Df represents time-dependent errors, which may include drift rate (D) as well as other environmental sensitivities (E). Thus, the first and second responses to the optical input at the first and second frequencies $f_1$ and $f_2$ are presented in equations (2) and (3).

$$(\Delta n_1/\Delta t)=\Omega+Df_1. \quad (2)$$

$$(\Delta n_2/\Delta t)=\Omega+Df_2. \quad (3)$$

Equation (4) expresses the known gyro rate ($\Omega$) in terms of the measured IFOG responses, the measured scale factors ($SF_1$ and $SF_2$), and the correction term (C):

$$\Omega=((\Delta n_1/\Delta t)-(\Delta n_2/\Delta t)-C)/(1/SF_1-1/SF_2) \quad (4)$$

where $Df_1+Df_2=C$. The correction term (C) represents the sum of the time-dependent errors in the first and second IFOG responses. The correction term (C) may be computed from Equation (4).

At block 340, the processor 140 may store the correction term (C) for later use in computing the gyro rate. The scale factors ($SF_1$ and $SF_2$) may be simplified to a constant value. For example, if $(1/SF_1-1/SF_2)=2$, the processor 140 may use equation (5) to compute the gyro rate.

$$\Omega=((\Delta n_1/\Delta t)-(\Delta n_2/\Delta t)-C)/2 \quad (5)$$

There is not a minimum or maximum difference between the first and second frequencies, so long as both frequencies can accurately measure the gyro rate. Each frequency depends on fiber type, phase modulation, coil bend, and coil length. The frequencies may be infrared frequencies.

A system and method herein are not limited to the examples above. For instance, the fiber light source may provide light at more than two input frequencies. Each additional frequency may be used to validate the calibration performed at the first and second frequencies.

The IFOG 110 may have either an open-loop or closed-loop configuration. The IFOG 110 may be active or passive, multi-mode or single mode, digital or analog. Typical applications for the system 100 include surveying, stabilization and inertial navigation systems.

Although a system 100 having a single IFOG 110 was described above, a system herein is not limited. A multi-axis system may have an IFOG 110 for each axis. Each IFOG 110 may have its own correction term.

The invention claimed is:

1. A method comprising:
supplying an optical input to an interferometric fiber optic gyro (IFOG) at a first frequency and then a different second frequency;
detecting a first phase variation between counter-propagating optical signals at the first frequency;
detecting a second phase variation between counter-propagating optical signals at the second frequency;
detecting a difference in the first phase variation and the second phase variation of the IFOG to the optical input at the first and second frequencies;
determining a rotation of the IFOG based on a gyro rate, wherein the gyro rate is a function of the difference and a correction term.

2. The method of claim 1, wherein the correction term represents a sum of time-dependent errors in the IFOG responses.

3. The method of claim 1, wherein the gyro rate is not computed as a function of a calibrated scale factor.

4. The method of claim 1, wherein the correction term is pre-computed according to initial first and second scale factors corresponding to the first and second frequencies.

5. The method of claim 4, further comprising continuing to repeat computing the gyro rate without calibrating both scale factors if time-dependent errors or an event occurs that causes both scale factors to shift equally.

6. The method of claim 1, wherein the gyro rate ($\Omega$) is computed as $$\Omega=((\Delta n_1/\Delta t)-(\Delta n_2\Delta t)-C)/(1/SF_1-1/SF_2)$$

where $SF_1$ and $SF_2$ are pre-determined IFOG scale factors corresponding to the first and second frequencies, C is the correction term, and $(\Delta n_1/\Delta t)-(\Delta n_2/\Delta t)$ is the difference in responses of the IFOG to the optical input at the first and second frequencies.

7. A system comprising:

an interferometric fiber optic gyro (IFOG);

a fiber optic light source for supplying an optical input to the IFOG at a first frequency and then a different second frequency;

a photodetector for detecting a first phase variation between counter-propagating optical signals at the first frequency and a second phase variation between counter-propagating optical signals at the second frequency of the IFOG to the optical input; and a processor for determining a rotation of the IFOG based on a gyro rate as a function of a difference of the first and second phase variation and a correction term.

8. The system of claim 7, wherein the correction term represents a sum of time-dependent errors in the IFOG responses.

9. The system of claim 7, wherein the gyro rate is not computed as a function of a calibrated scale factor.

10. The system of claim 7, wherein the correction term is pre-computed according to original first and second scale factors at the first and second frequencies.

11. The system of claim 10, further comprising repeatedly computing the gyro rate without calibrating both scale factors if time-dependent errors or an event occurs that causes both scale factors to shift equally.

12. The system of claim 7, wherein the gyro rate ($\Omega$) is computed as $$\Omega = ((\Delta n_1/\Delta t) - (\Delta n_2/\Delta t) - C)/(1/SF_1 - 1/SF_2)$$

where $SF_1$ and $SF_2$ are pre-determined IFOG scale factors corresponding to the first and second frequencies, C is the correction term, and $(\Delta n_1/\Delta t) - (\Delta n_2/\Delta t)$ is the difference in responses of the IFOG to the optical input at the first and second frequencies.

13. A method for an interferometric fiber optic gyro (IFOG) comprising:

applying a known rate to the IFOG and determining IFOG scale factors for optical inputs at first and second frequencies;

providing an optical input to the IFOG at the first frequency and detecting a first phase variation between counter-propagating optical signals at the first frequency of the IFOG;

switching the optical input to the second frequency and detecting a second phase variation between counter-propagating optical signals at the second frequency of the IFOG; and using a difference between the first and second phase variations, the known rate, and the scale factors to determine an IFOG correction term representing a sum of time-dependent errors in the first and second IFOG phase variations.

14. The method of claim 13, wherein the correction term (C) is computed from $$\Omega = ((\Delta n_1/\Delta t) - (\Delta n_2/\Delta t) - C)/(1/SF_1 - 1/SF_2)$$

where $\Omega$ is the known rate, $SF_1$ and $SF_2$ are the scale factors corresponding to the first and second frequencies of the optical input, and $(\Delta n_1/\Delta t) - (\Delta n_2/\Delta t)$ is the difference of the first and second IFOG phase variations.

* * * * *